US008186023B2

(12) United States Patent
Millar et al.

(10) Patent No.: US 8,186,023 B2
(45) Date of Patent: May 29, 2012

(54) RETROFITTABLE HOOK DEVICE

(75) Inventors: Richard H. Millar, Silverwater (AU); Robin A. Sannes, Minneapolis, MN (US)

(73) Assignee: Capital Safety Group (Australia) Pty Limited, Sydney (AU)

( * ) Notice: Subject to any disclaimer, the term of this patent is extended or adjusted under 35 U.S.C. 154(b) by 377 days.

(21) Appl. No.: 12/576,875

(22) Filed: Oct. 9, 2009

(65) Prior Publication Data
US 2010/0199472 A1 Aug. 12, 2010

Related U.S. Application Data

(63) Continuation-in-part of application No. 12/368,590, filed on Feb. 10, 2009.

(51) Int. Cl.
*A44B 13/00* (2006.01)
(52) U.S. Cl. .......................... 24/265 H; 24/302
(58) Field of Classification Search ............... 24/265 H, 24/265 R, 265 E, 265 BC, 265 A, 265 EC, 24/265 CD; 254/294, 390–394, 376, 401, 254/403, 411
See application file for complete search history.

(56) References Cited

U.S. PATENT DOCUMENTS

| | | | |
|---|---|---|---|
| 3,686,711 A | 8/1972 | Kuramoto et al. | |
| 4,464,813 A * | 8/1984 | Bakker et al. | 24/601.1 |
| 4,977,647 A | 12/1990 | Casebolt | |
| 4,991,689 A | 2/1991 | Cole | |
| 5,368,281 A * | 11/1994 | Skyba | 254/391 |
| 5,384,943 A | 1/1995 | LeFebvre et al. | |
| 5,669,119 A | 9/1997 | Seron | |
| 5,915,630 A | 6/1999 | Step | |
| 6,068,242 A * | 5/2000 | Kingery | 254/391 |
| 6,070,308 A | 6/2000 | Rohlf | |
| 6,092,791 A * | 7/2000 | Kingery | 254/371 |
| 6,149,133 A * | 11/2000 | Skyba | 254/391 |
| 6,938,306 B2 | 9/2005 | Joubert et al. | |
| 7,036,189 B2 | 5/2006 | Steigerwald | |
| 7,111,572 B1 * | 9/2006 | Yang | 114/199 |
| 7,228,600 B1 | 6/2007 | Selby et al. | |

(Continued)

FOREIGN PATENT DOCUMENTS
AU 2003203691 A1 11/2004
(Continued)

OTHER PUBLICATIONS
International Search Report from Serial No. PCT/US2009/064095, mailed Jan. 5, 2010.
(Continued)

*Primary Examiner* — Robert J Sandy
*Assistant Examiner* — Abigail E Morrell
(74) *Attorney, Agent, or Firm* — IPLM Group, P.A.

(57) ABSTRACT

A retrofittable hook protection device for use with a hook is provided. The hook includes an intermediate portion interconnecting a hook portion and an end having an aperture, a gate for opening and closing an opening proximate the hook portion, and a lanyard operatively connected to the end proximate the aperture. The protection device includes a first and second member. The first member is configured and arranged to receive a first portion of the lanyard and a second portion of the end proximate a first side of the hook. A second member is configured and arranged to receive a third portion of the lanyard and a fourth portion of the end proximate a second side of the hook. The first and second members are connectable to sandwich the portions of the lanyard and the end there between.

6 Claims, 10 Drawing Sheets

U.S. PATENT DOCUMENTS

| | | | |
|---|---|---|---|
| 7,287,303 B2 * | 10/2007 | Yang | 24/134 R |
| 7,445,195 B1 * | 11/2008 | Huang | 254/391 |
| 7,537,199 B1 * | 5/2009 | Anderson | 254/411 |
| 7,562,862 B1 * | 7/2009 | Jackson | 254/376 |
| 7,971,269 B2 | 7/2011 | Buckley | |
| 2007/0062014 A1 | 3/2007 | Casebolt | |

FOREIGN PATENT DOCUMENTS

| | | |
|---|---|---|
| EP | 0 004 586 | 10/1979 |
| EP | 0 004 586 A2 | 10/1979 |
| JP | 2008-086738 | 4/2008 |

OTHER PUBLICATIONS

DBI SALA,EZ-Stop It Tie-Back Lanyards, Single Leg Model 1241124, Form 9700275 rev: A. www.capitalsafety.com.

Monadelphous HSE Alert, Alert No. A68, MGL-PRO-189 HSE Alerts & Bulletins Procedure, Sep. 18, 2008.

Non-Final Office Action for U.S. Appl. No. 12/368,590 mailed Sep. 1, 2011.

Notice of Allowance for U.S. Appl. No. 12/368,590 mailed on Feb. 16, 2012.

* cited by examiner

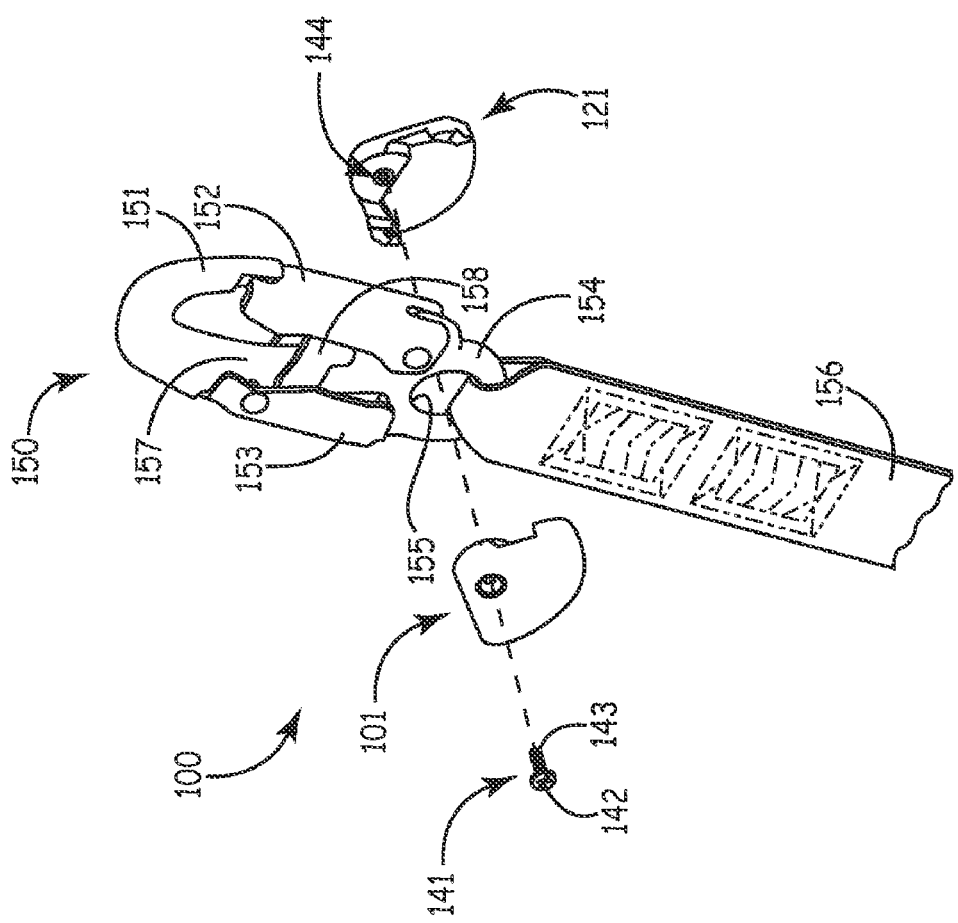
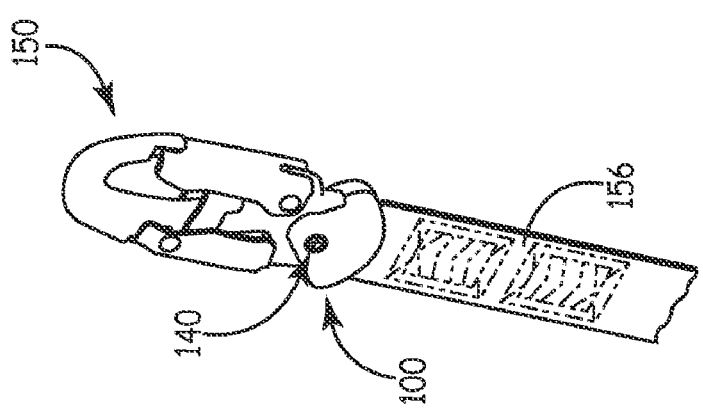

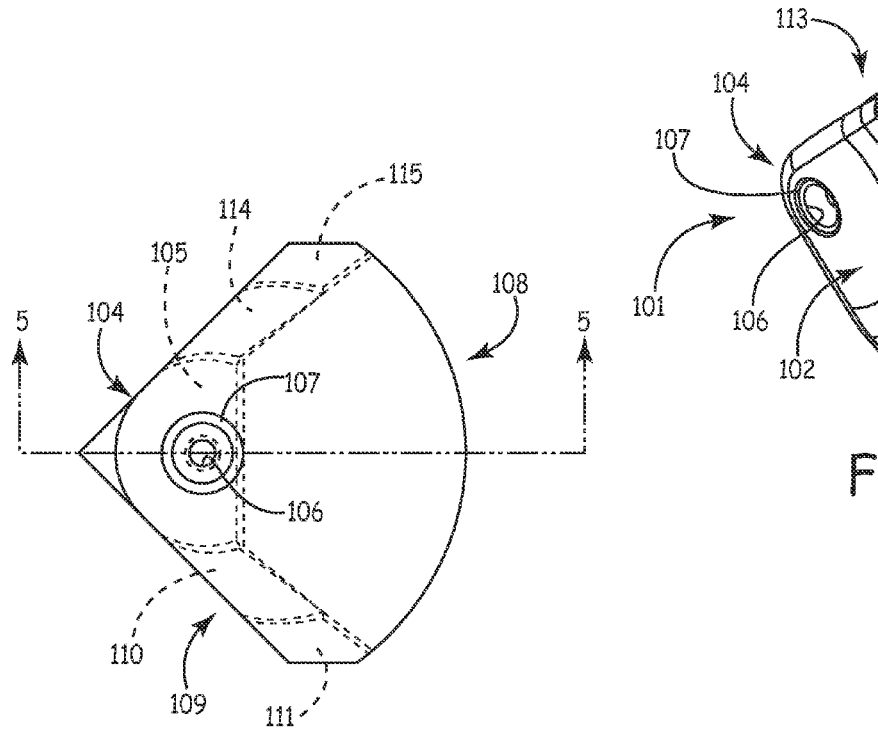
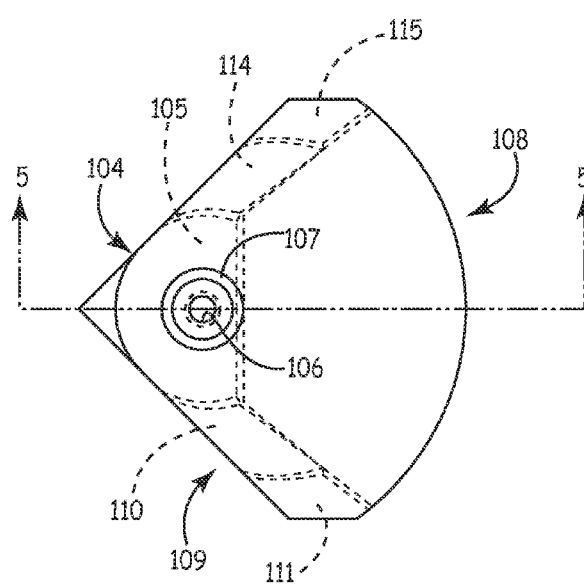
FIG. 4
FIG. 3
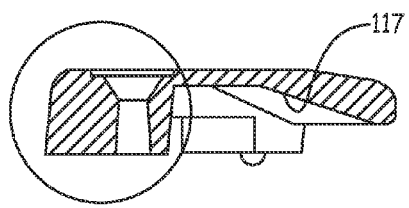
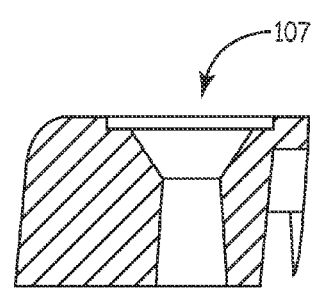
FIG. 5
FIG. 6

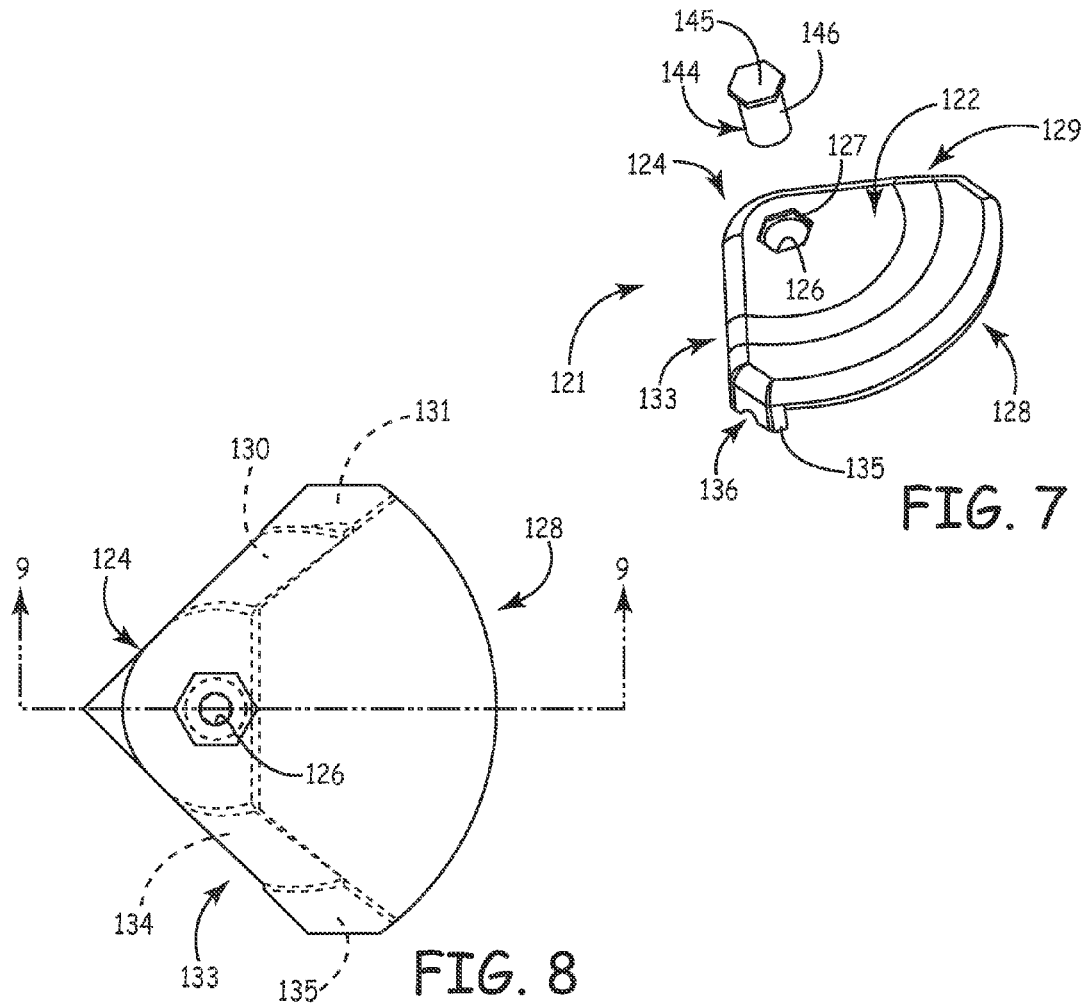
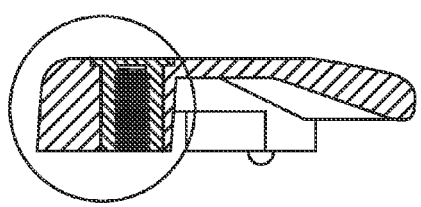
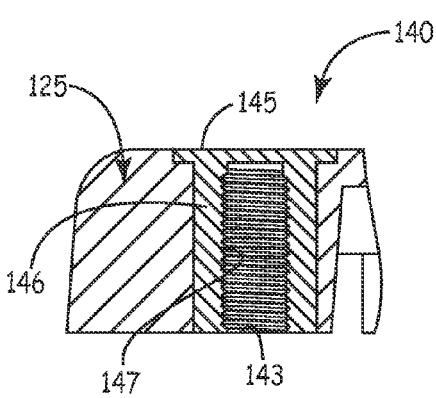

RETROFITTABLE HOOK DEVICE

CROSS-REFERENCE TO RELATED APPLICATIONS

The present application is a continuation in part (CIP) of U.S. patent application Ser. No. 12/368,590 filed on Feb. 10, 2009 having the same title "Retrofittable Hook Device," which is herein incorporated in its entirety.

BACKGROUND

A lanyard is commonly used by a worker to interconnect a support structure and a safety harness donned by the worker. The lanyard is commonly connected to the support structure with a hook operatively connected to an end of the lanyard. The hook is commonly directly connected to an anchorage member operatively connected to the support structure or the lanyard is wrapped about the support structure and the hook engages the lanyard (commonly referred to as a "tie-back" lanyard). The lanyard could also include a shock absorber to reduce the amount of force exerted upon the worker should a fall occur.

"Roll-out" may occur when the lanyard or the shock absorber contacts or engages an activator of the hook thereby inadvertently applying pressure to the activator causing the hook's locking gate to open. In a roll-out situation this action allows the anchorage member or the tied-back portion of the lanyard to be released from the hook. Should roll-out occur, the worker is no longer connected to the support structure and should a fall occur, the consequences could be life-threatening. Another life-threatening situation could occur if one worker unintentionally disconnects another worker's lanyard.

For the reasons stated above and for other reasons stated below, which will become apparent to those skilled in the art upon reading and understanding the present specification, there is a need in the art for a hook protection device to reduce the risk of roll-out.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a retrofittable hook protection device for use with a hook is provided. The hook includes an intermediate portion interconnecting a hook portion and an end having an aperture, a gate for opening and closing an opening proximate the hook portion, and a lanyard operatively connected to the end proximate the aperture. The protection device includes a first and second member. The first member is configured and arranged to receive a first portion of the lanyard and a second portion of the end proximate a first side of the hook. A second member is configured and arranged to receive a third portion of the lanyard and a fourth portion of the end proximate a second side of the hook. The first and second members are connectable to sandwich the portions of the lanyard and the end there between.

BRIEF DESCRIPTION OF THE DRAWINGS

The present invention can be more easily understood and further advantages and uses thereof more readily apparent, when considered in view of the detailed description and the following figures in which:

FIG. 1 is a perspective view of a hook protection device operatively connected to a lanyard with a hook;

FIG. 2 is an exploded perspective view of the hook protection device and a perspective view of the lanyard with the hook shown in FIG. 1;

FIG. 3 is a perspective view of a first portion of the hook protection device shown in FIG. 1;

FIG. 4 is a top view of the first portion shown in FIG. 3;

FIG. 5 is a cross section view of the first portion taken along the lines 5-5 in FIG. 4;

FIG. 6 is a section of the first portion from FIG. 5;

FIG. 7 is a perspective view of a second portion of the hook protection device shown in FIG. 1;

FIG. 8 is a top view of the second portion shown in FIG. 7;

FIG. 9 is a cross section view of the second portion taken along the line 9-9 in FIG. 8;

FIG. 10 is a section of the second portion from FIG. 9;

In accordance with common practice, the various described features are not drawn to scale but are drawn to emphasize specific features relevant to the present invention. Reference characters denote like elements throughout Figures and text.

DETAILED DESCRIPTION

Figure 11:
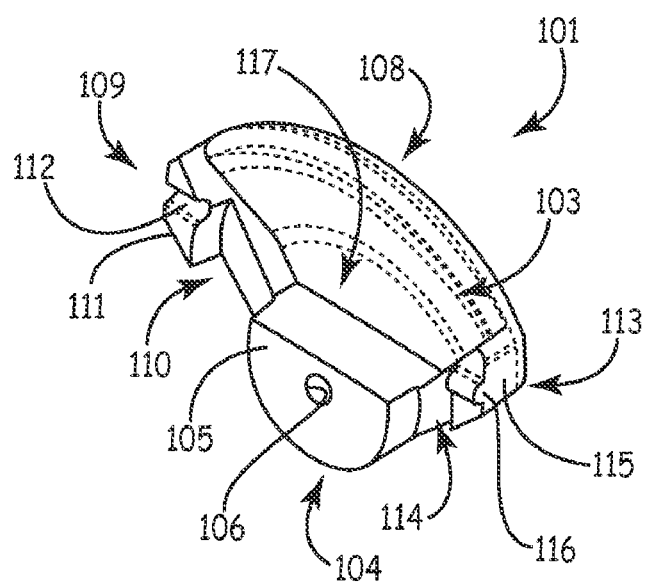
FIG. 11 is a perspective view of the first portion shown in FIG. 3 showing an inner surface.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a retrofittable hook protection device that helps prevent roll-out situations and unintentional lifeline disconnects. One embodiment hook protection device constructed in accordance with the principles of the present invention is designated by the numeral 100 in FIGS. 1 and 2. The hook protection device 100 is retrofittable for use with a variety of different lanyards including hooks. The word "lanyard" could mean a lanyard or other suitable type of lifeline made of webbing or other suitable type of material such as, but not limited to, rope, wires, cables etc. One example of a suitable hook that could be used with the present invention is also shown in FIGS. 1 and 2. The hook 150 includes an intermediate portion 157 interconnecting a hook portion 151 and an end 154. A gate 152 is pivotally connected to the hook body proximate the intermediate portion 157 and the end 154, and the gate 152 pivots to open and close the opening of the hook portion 151. An actuator 153 is pivotally connected to a lock 158 and the hook body proximate the intermediate portion 157 and the hook portion 151. The lock 158 extends outward from the actuator 153 and reinforces the gate 152 in the locked position. In this hook 150, the actuator 153 is pivoted, which pivots the lock 158 and allows the gate to be pivoted from the locked position to an unlocked position. The gate 152 and the lock 158 are spring biased in the locked position. The end 154 includes an aperture or eye 155 through which an end of a lanyard 156 made of webbing is inserted, folded back onto itself, and secured with stitching. A shock absorber (not shown) could be operatively connected to the webbing proximate the end 154 of the hook 150.

Although any suitable type of hook could be used, examples of suitable hooks that could be used are hooks manufactured by DBI/SALA of Red Wing, Minn., hooks disclosed in U.S. Pat. Nos. 4,977,647; 6,070,308; and U.S. Patent Application Publication No. US 2007/0062014, and other suitable types of hooks.

The hook protection device 100 includes a first portion 101 and a second portion 121 that are releasably connectable proximate where the lanyard connects to the hook to protect the gate from being inadvertently opened.

The first portion 101 includes an outer surface 102, shown in FIG. 3, and an inner surface 103, shown in FIG. 11. The inner surface 103 faces the lanyard and the hook. The first portion 101 also includes a top 104, a bottom 108, a first side 109, and a second side 113. Extending outward from the inner surface 103 proximate the top 104 and the sides 109 and 113 is an extension portion 105 through which a bore 106 extends to the outer surface 102. The bore 106 includes a countersunk portion 107 proximate the outer surface 102.

Proximate the bottom 108, the first side 109 includes a first side extension portion 111 extending outward from the inner surface 103. The first side 109 includes a notch 110 between the first side extension portion 111 and the extension portion 105. The first side extension portion 111 includes a receiving notch 112.

Proximate the bottom 108, the second side 113 includes a second side extension portion 115 extending outward from the inner surface 103. The second side 113 includes a notch 114 between the second side extension portion 115 and the extension portion 105. The second side extension portion 115 includes a protrusion 116 extending outward therefrom.

Figure 12:
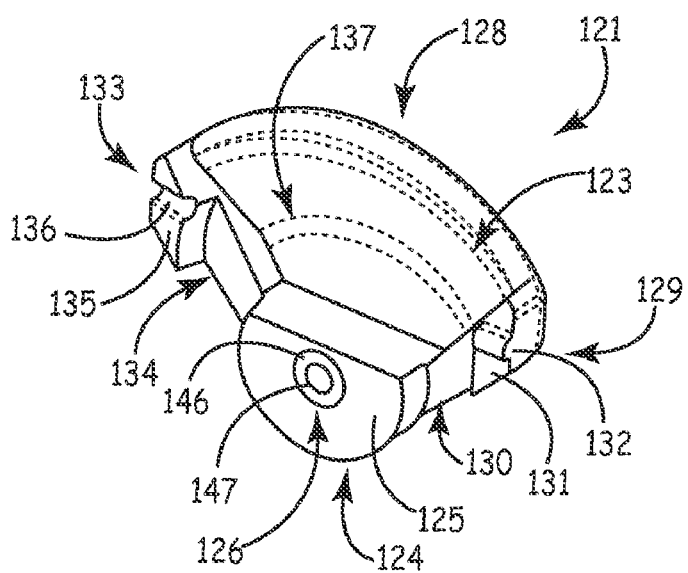
FIG. 12 is a perspective view of the second portion shown in FIG. 7 showing an inner surface.

The second portion 121 includes an outer surface 122, shown in FIG. 7, and an inner surface 123, shown in FIG. 12. The inner surface 123 faces the lanyard and the hook. The second portion 121 also includes a top 124, a bottom 128, a first side 129, and a second side 133. Extending outward from the inner surface 123 proximate the top 124 and the sides 129 and 133 is an extension portion 125 through which a bore 126 extends. The bore 126 includes a countersunk portion 127 proximate the outer surface 122. The countersunk portion 127 is hexagonal-shaped.

Proximate the bottom 128, the first side 129 includes a first side extension portion 131 extending outward from the inner surface 123. The first side 129 includes a notch 130 between the first side extension portion 131 and the extension portion 125. The first side extension portion 131 includes a protrusion 132 extending outward therefrom.

Proximate the bottom 128, the second side 133 includes a second side extension portion 135 extending outward from the inner surface 123. The second side 133 includes a notch 134 between the second side extension portion 135 and the extension portion 125. The second side extension portion 135 includes a receiving notch 136.

When the inner surfaces 103 and 123 are facing one another and the first and second portions 101 and 121 are put together, the bores 106 and 126 of the first portion 101 and the second portion 121 align and the protrusions 116 and 132 mate with the receiving notches 136 and 112, respectively. The inner surface 103 of the first portion 101 includes a cavity 117 between the extension portions 105, 111, and 115; and the inner surface 123 of the second portion 121 includes a cavity 137 between the extension portions 125, 131, and 135. The notches 110 and 130, the notches 114 and 134, and the bottoms 108 and 128 form openings providing access to the cavities 117 and 137, which form a single cavity between the portions 101 and 121.

A fastener is inserted through the bores 106 and 126 to interconnect the first portion 101 and the second portion 121. An example of a suitable fastener is a two-piece fastener 140. The first portion 141 includes a head 142 operatively connected to a threaded shaft 143. The second portion 144 includes a head 145, which is preferably hexagonal, operatively connected to a shaft 146 with a threaded bore 147 extending longitudinally therethrough. The threaded bore 147 is configured and arranged to mate with the threaded shaft 143 and connect the first and second portions 141 and 144. Thus, the hexagonal head 145 fits within the countersunk portion 127 of the second portion 121, which prevents the fastener's second portion 144 from rotating, and the shaft 146 extends through the bore 126. The threaded shaft 143 is inserted through the bore 106 of the first portion 101, and a screwdriver is used to rotate the fastener's first portion 141 to mate the threaded shaft 143 with the threaded bore 147. The fastener 140 keeps the first and second portions 101 and 121 together and the mating protrusions 116 and 132 and receiving notches 136 and 112, respectively, prevent the first and second portions 101 and 121 from rotating about the fastener 140. The fastener could also be a screw, a rivet, a bolt and a nut, mating snaps, and other suitable types of fasteners.

The device 100 is retrofittable and reusable, and the device 100 could be added to a variety of different webbing lanyards with hooks. For example, the device 100 could be used with lanyards made of webbing of varying widths such as 25 millimeters, 45 millimeters, and 50 millimeters. The pattern of the stitching on the lanyard's webbing should not affect the operation of the device 100. The device 100 could also be used with rope, wire, cable, or other types of lanyards. Depending upon the type of lanyard, it is recognized that some modification may be needed to accommodate the lanyard.

To connect the device 100 to a lanyard with a hook, the first and second portions 101 and 102 are positioned so that their inner surfaces 103 and 123 face each other and the top extension portions 105 and 125 are inserted into the hook's aperture 155 from opposing sides of the hook with the bottoms of the top extension portions 105 and 125 positioned proximate the lanyard. The top extension portions 105 and 125 preferably fill-in a majority of the aperture 155. The respective mating protrusions 116 and 132 and receiving notches 136 and 112 are positioned on opposing sides of the lanyard and connected and the bores 106 and 126 of the top extension portions 105 and 125 are aligned. The portions of the lanyard and the end of the hook are sandwiched between the first and second portions 101 and 121, and the lanyard extends through the opening between the bottoms 108 and 128. At least one of the fastener's portions is inserted through the bores 106 and 126 to secure the first and second portions 101 and 121 together. The second portion 144 of the fastener 140 could be glued or otherwise connected to the second portion 121. Thus, only the first portion 141 may need to be inserted through the bores 106 and 126.

Generally, the device 100 assists in preventing the webbing from moving on the hook's end, contacting the hook's actuator, and allowing the gate to open inadvertently, which reduces the risk of roll-out. More specifically, the device 100 prevents the webbing from contacting the hook's actuator by substantially filling-in the remaining space in the hook's aperture with the top extension portions 105 and 125 and by forming a tight fit against the webbing and the hook's end to which the webbing is connected. The two portions 101 and 121 clamp down and place pressure on the webbing and the hook's end to hold the webbing firmly against the hook's end and so doing limits the movement of the webbing on the hook's end, which assists in preventing the webbing from contacting the hook's actuator. The fastener 140 assists in securing the two portions 101 and 121 together to form the tight fit against the webbing and the hook's end. Without the device 100, should the webbing rotate on the hook's eye and contact the actuator of the hook, the gate could then be opened and allow for roll-out, which is the unintentional disengagement of the hook from the connecting point.

The device 100 is could be made of a clear, high impact plastic to enable inspection of the webbing without removing the device 100. The device 100 also preferably includes a UV protective coating. The first and second portions 101 and 121 are releasably connectable and reusable.

Figure 13:
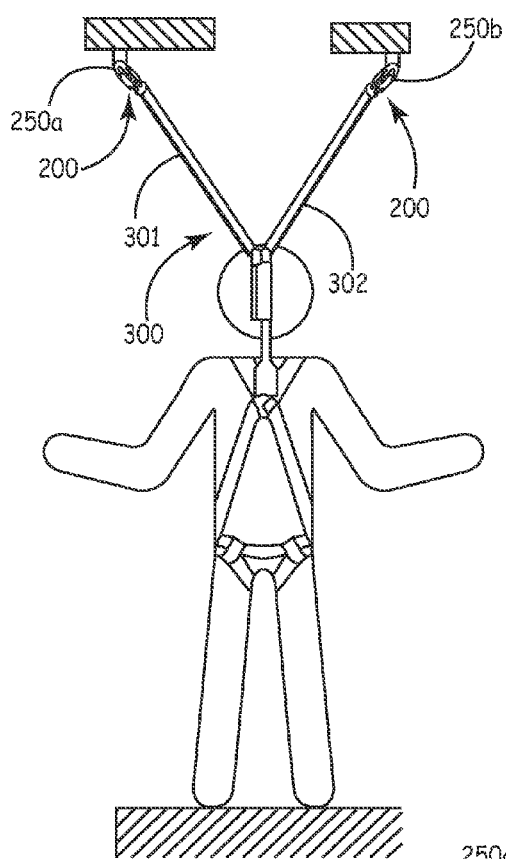
FIG. 13 illustrates a worker connected to a support structure with both legs of a twin leg lanyard.
Figure 14:
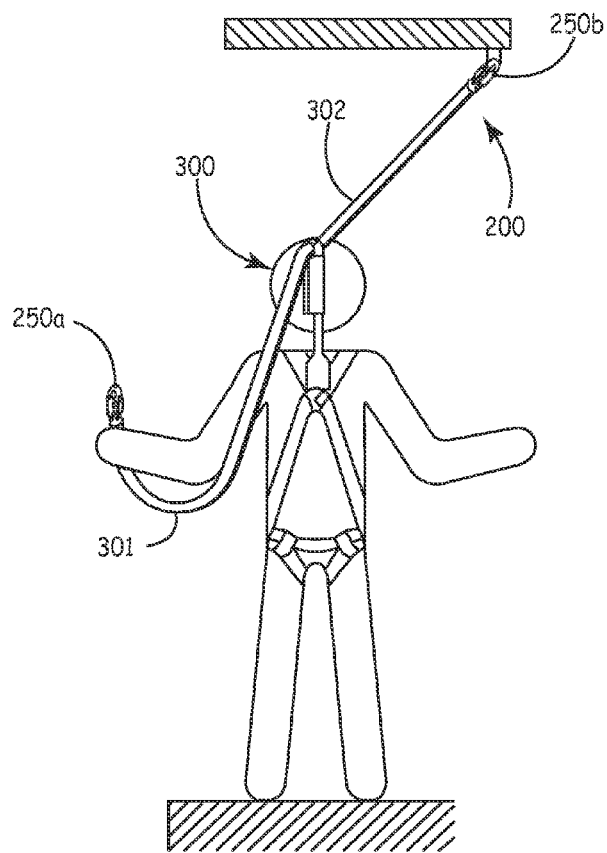
FIG. 14 illustrates a worker connected to a support structure with one leg of a twin leg lanyard.

Another embodiment hook device 200 could be made of various colors to color-code hooks connected to lanyards, in which case the device 200 could be similarly constructed as device 100, but device 200 would not need to substantially fill-in the remaining space in the hook's aperture with the top extension portions or form a tight fit against the lanyard and the hook's end to which the lanyard is connected. For example, as shown in FIGS. 13 and 14, the device 200 could be connected to the hooks 250*a* and 250*b* operatively connected to first and second legs 301 and 302, respectively, of a twin leg lanyard 300 as a color-coded indicator. As shown in FIGS. 13 and 14, a worker is using the twin leg lanyard 300 to "leapfrog" from one support structure to another. An example of a suitable twin leg lanyard is the SHOCKWAVE™ 2 twin leg lanyard by DBI/SALA of Red Wing, Minn. The device 200 could also be connected to the hooks of a self-retracting lifeline such as the TALON™ twin leg self-retracting lifeline by DBI/SALA of Red Wing, Minn. Other example uses include, but are not limited to, single tail lanyards, pole straps, inertia reel blocks and the like.

One possible situation in which using color-coding is helpful is when two or more workers are performing tasks in relatively close proximity and there is a risk one worker could unintentionally disconnect the other worker's lanyard. In such a situation, one worker could use one color and the other worker could use another color to avoid any possible confusion.

Figures 15, 16:
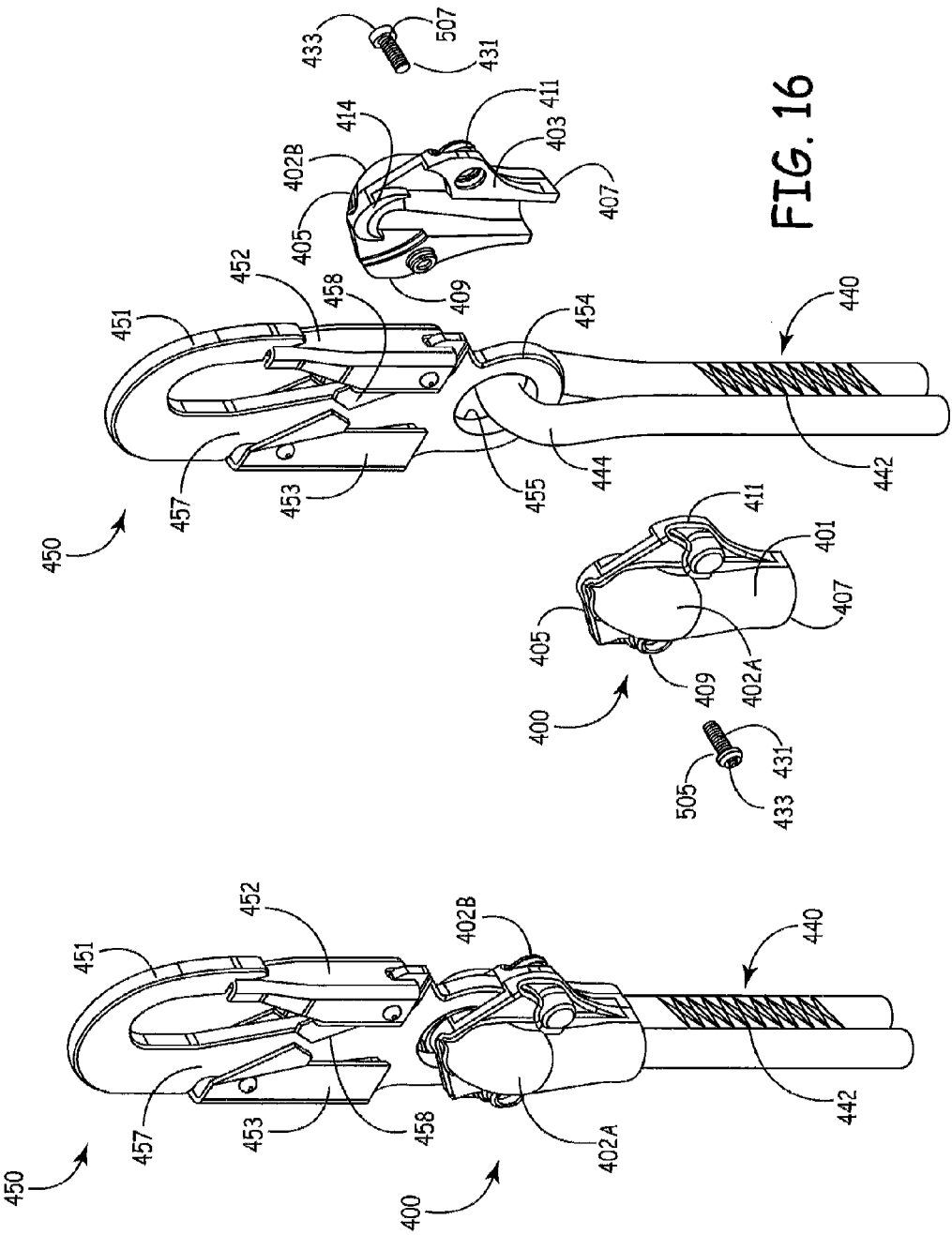
FIG. 15 is a perspective view of a hook protection device operatively connected to a lanyard with a hook of one embodiment of the present invention.
FIG. 16 is an exploded perspective view of the hook protection device and a perspective view of a lanyard with the hook shown in FIG. 15.

Another example embodiment of a hook protection device 400 is illustrated in FIG. 15. The hook protection device 400 is retrofittable for use with a variety of different lanyards including hooks. This embodiment is suitable for use with a lanyard or other suitable type of lifeline made of rope, wire, cable or the like. An example of a suitable hook 450 that could be used with the present invention is also shown in FIGS. 15 and 16. Similar to hook 150 described above, hook 450 includes an intermediate portion 457 interconnecting a hook portion 451 and an end portion 454. A gate 452 is pivotally connected proximate the intermediate portion 457 and the end portion 454 of the hook 450. The gate 452 pivots to open and close the opening of the hook portion 451. An actuator 453 (locking gate) is pivotally connected to the hook body proximate the intermediate portion 457 and the hook portion 451. The lock 458 reinforces the gate 452 in the locked position. The lock is selectively disengaged by the actuator 453. In this particular embodiment, when the actuator 453 is pivoted it disengages the lock 458. This allows the gate 452 to be pivoted from the locked position to an unlocked position. The gate 452 and the Lock 458 are spring biased in the locked position. The end portion 454 includes an aperture or eye 455 through which an end 444 of a lanyard 440 made of rope, or the like, is inserted, looped and secured with stitching 442. A shock absorber (not shown) could be operatively connected to the rope proximate the end 454 of the hook 450.

The hook protection device 400 includes a first hook protection portion 402A and a second hook protection portion 402B (first and second members). The first hook protection portion 402A and the second hook protection portion 402B are releasably connected proximate where the lanyard 440 connects to the hook 450 as illustrated in FIGS. 15 and 16. Each portion 402A and 402B includes an outer surface 401 and an inner surface 403. The inner surface 403 of each portion 402A and 402B faces the lanyard 440 and the hook 450. The first portion 401 also includes a first end 405, a second end 407, a first side 409, and a second side 411. The portions 402A and 402B are releasably coupled to each other by fasteners such as fasteners 505 and 507 as further described below. The arrangement of the hook protection device 400 on the end 444 of a lanyard 440 prevents gate 452 from being inadvertently opened by movement of the lanyard 440 thereby preventing roll-out.

Figure 17:
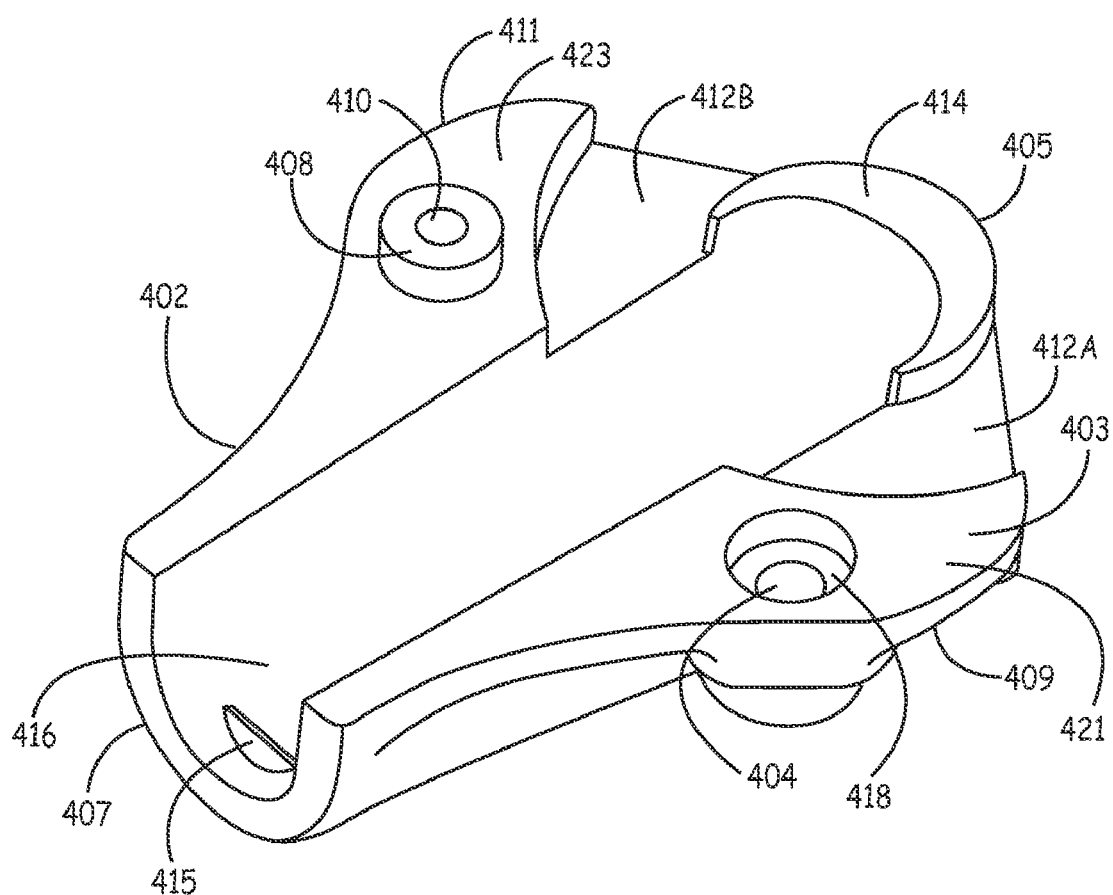
FIG. 17 is a perspective view illustrating an inner surface of a hook protection portion of the hook protection device of an embodiment of the present invention.

The hook protection portions 402A and 402B in this embodiment are substantially identical. In other embodiments (not shown) they are not substantially identical. An example hook protection portion is illustrated in detail in FIG. 17 through FIG. 20. In FIGS. 17 through 20, the hook protection portion is identified generally as hook protection portion 402. Referring to FIG. 17 a perspective view illustrating the inner surface of a hook protection portion 402 is generally shown. The hook protection portion 402 includes a mid channel 416 (lanyard channel) that extends from the second end 407 of the hook protection portion 402 a given length to proximate the first end 405 of the hook protection portion 402. The mid channel 416 extends generally midway between the first and second sides 409 and 411 of the hook protection portion 402. When two hook protection portions 402 are mated, the mid channels 416 in respective hook protection devices (i.e. 402A and 402B of FIGS. 15 and 16) align thereby providing a path or cavity for the lanyard 440 that in one embodiment is made from rope. Although the embodiments illustrated in FIGS. 15 through 20 have a mid channel 416 that has generally a cross-sectional C-shape (to accommodate a lanyard 440 made of rope), any shape can be used. The cross-sectional shape of the mid channel 416 is determined by the shape of the lanyard 440. In one embodiment a small lanyard engaging protrusion 415 (protrusion) extends outward from an inner surface of the mid channel 416 proximate the second end of the hook protection portion 407. The protrusion 415 helps secure a lanyard 440 in place in the mid channel 416 when the two hook protections portions (i.e.

402A and 402B of FIGS. 15 and 16) are mated together by pressing the lanyard 440 (rope portions) together in the path or cavity formed by the two hook protection portions 402.

Referring to FIG. 17, the hook protection portion 402 further includes first and second flanges 421 and 423 that flare out from the mid channel 416 generally proximate the first end 405 of the hook protection portion 402. The first flange 421 extends from the mid channel 416 to define the first side 409 of the hook protection portion 402. The second flange 423 extends from the mid channel 416 to define the second side 411 of the hook protection portion 402. The inner surface 403 of the first flange 421 includes a first side curved channel 412A (first hook channel) that runs from the mid channel 416 to proximate the first end of the hook protection portion 402. The second flange 423 has a similar second side curved channel 412B (second hook channel) that extends from the mid channel 416 to proximate the first end of the hook protection portion 402. The cross-sectional shape of the first and second side channels 412A and 412B as illustrated in FIG. 4 are generally U-shaped. However, the cross-sectional shape of the first and second side channels 412A and 412B can be any shape that will accommodate the shape of an end of a hook.

The first and second side curved channels 412A and 412B are generally symmetrical about the mid channel 416 in this embodiment. In the embodiment of FIG. 17, the mid channel 416 and the first and second side curved channels 412A and 412B form a generally v-shaped channel in the inner surface 403. However, the shape of the channels in the inner surface 403 is dependant on the shape of the end portion 454 of the hook 450 and the lanyard 440. In the embodiment of FIG. 17, a termination end of the mid channel 416 and inner radius of the first and second side curved channels 412A and 412B form a hook retaining portion 414 (top extension portion). The hook retaining portion 414 in this embodiment is crescent shaped. When two hook protection portions (402A and 402B of FIGS. 15 and 16) are mated to form a hook protection device 400, the first and second side curved channels 412A and 412B of a first hook protection portion 402A align with respective first and second side curved channels 412A and 412B of a second hook protection portion 402B to form paths or cavities that encase portions of an end of the a hook 450. Abutting hook retaining portions 414 of mated hook protection portions 402A and 402B, positioned in the eye 455 of the hook 450, retain the hook protection portions 402A and 402B to the end portion 454 of the hook 450.

Referring back to inner surface 403 of the hook protection portion of FIG. 4, the first flange 421 includes a generally circular recess 418 that is located between the first side curved channel 412A and the second end 407 of the hook protection portion 402. A bore 404 extends through recess 418. Bore 404 extends all the way through the hook protection portion 402. The second flange 423 includes a generally circular protrusion 408 that extends outward from the inner surface 403 of the first flange 423. Protrusion 408 is located between the second side curved channel 412B and the second end 407 of the hook protection portion 402. A threaded bore 410 extends into protrusion 408. Threaded bore 410 does not pass all the way through the hook protection portion 402. When two hook protection portions (402A and 402B of FIGS. 15 and 16) are mated, the protrusion 408 on the second flange 423 of the first hook protection portion 402A is received in the recess 418 in the first flange 421 of the second hook protection portion 402B and the protrusion 408 on the second flange 423 of the second hook protection portion 402B is received in the recess 418 in the first flange 421 of the first hook protection portion 402A. This arrangement causes the mid channels 416, the first and second side curved channels 412A and 412B, the hook retaining portions 414 as well as the protrusion 415 in the respective mid channels 416 of the mated first and second hook protection portions 402A and 402B to align.

Figure 18:
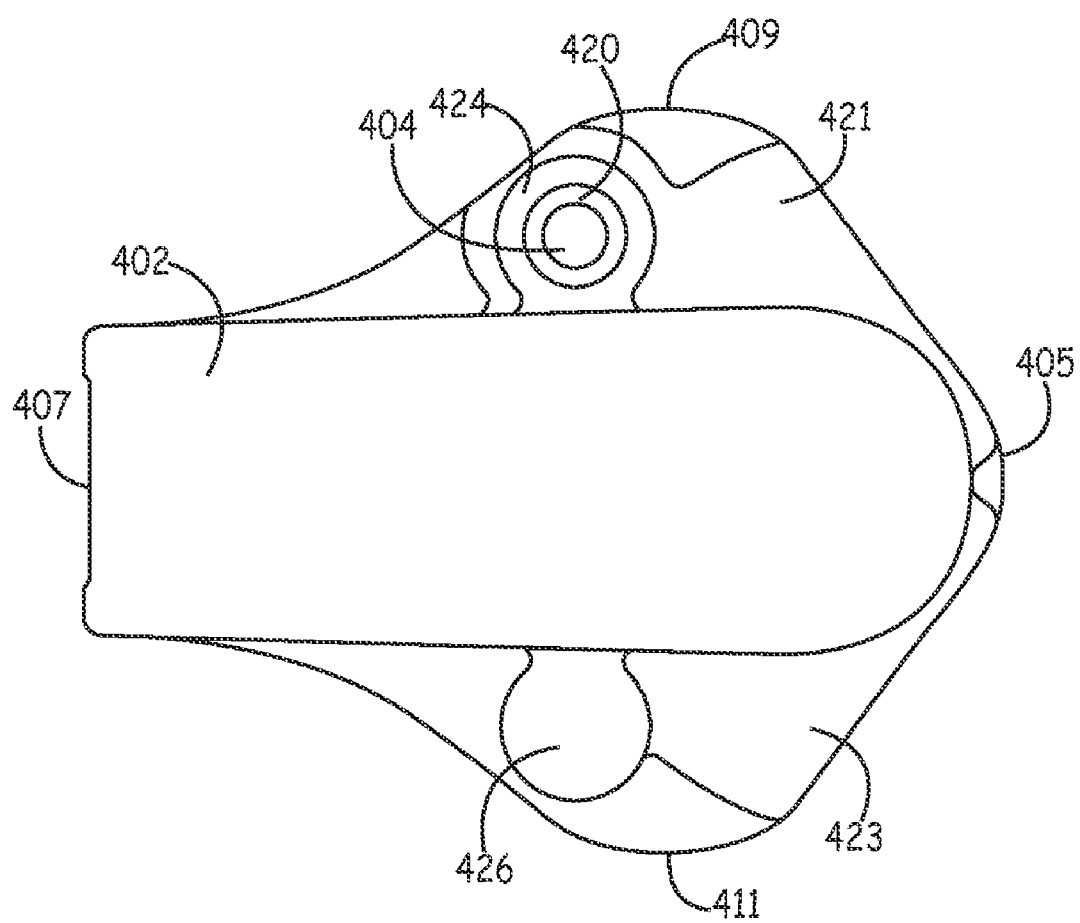
FIG. 18 is a top view illustrating an outer surface of the portion hook protection portion of FIG. 17.
Figure 19:
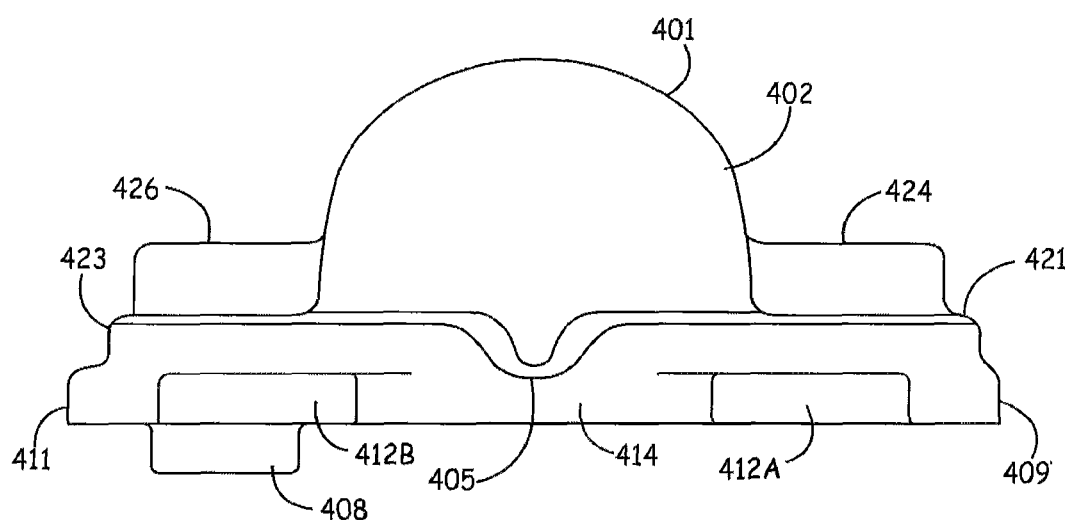
FIG. 19 is an end view of the portion of the hook protection portion of FIG. 17.
Figure 20:
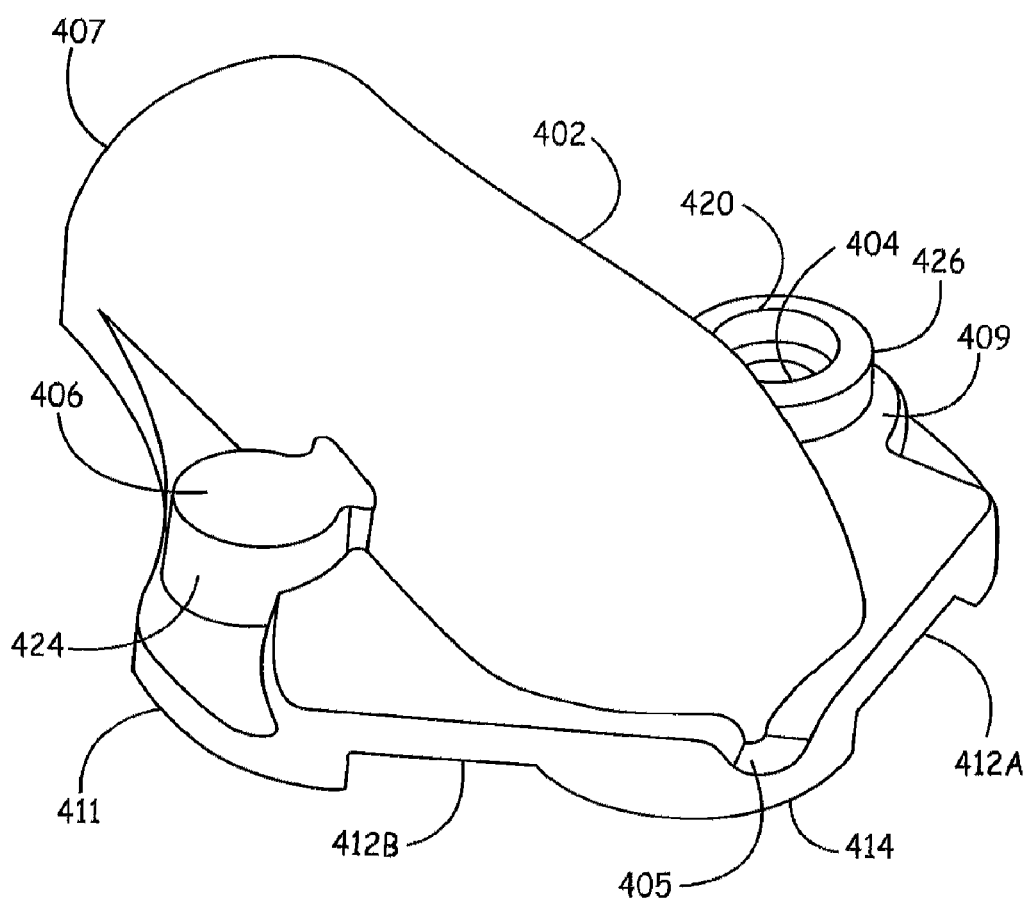
FIG. 20 is a perspective view illustrating the outside surface of the hook protection portion of FIG. 17.

Referring to FIGS. 18, 19 and 20 the outer surface 401 of the hook protection portion 402 is illustrated. As illustrated, the outer surface 401 of the first flange 421 include a first cap portion 424. The first cap portion 424 extends from the outer surface 401 of the first flange 421. Bore 404 in the first flange 409 extends through the first cap portion 424. A countersink 420 in the outer surface 401 is located around bore 404. Also illustrated is a cap portion 426 that extends over bore 410 from the outer surface of the second flange 423. Cap portion 426 of the second flange 423 houses threaded bore 410. In the embodiment shown, when two hook protection portions are mated (402A and 402B of FIGS. 15 and 16), a fastener, such as bolts 505 and 507 in FIG. 16, are inserted in countersink 420 in the respective first cap portion 424 of the respective hook protection portions 402A and 402B and through the respective bores 404. The threads 431 of the bolts 505 and 507 threadably engage threaded bores 410 in the respective second flanges 423 of the respective first and second hook protection portions 402A and 402B while the head 433 of the bolts 505 and 507 are received in countersink 420. This couples the hook protection portions 402A and 402B together to form the hook protection device 400 as illustrated in FIG. 15. Other types of fasteners are contemplated for connecting the hook protection portions 402A and 402B including, but not limited to, screws, rivets, bolts and nuts, mating snaps, and other suitable types of fasteners. For example, in an embodiment, bolts 505 and 507 are self tapping screws that form their own threads in bores 410 in the respective second flanges 423 to couple the hook protection portions 402A and 402B together.

The hook protection device 400 is retrofittable and reusable, and the device 400 could be added to a variety of different rope lanyards with hooks. The pattern of the stitching 442 on the lanyard's rope 440 should not affect the operation of the device 400. The device 400 could also be used with wire, cable, or other types of lanyards. Depending upon the type of lanyard, it is recognized that some modification may be needed to accommodate the lanyard.

To connect the hook protection device 400 to a lanyard with a hook 450, the first and second portions 402A and 402B are positioned so that their inner surfaces 403 face each other. Then the hook retaining portions 414 are inserted into the hook's aperture 455 from opposing sides of the hook 450. In one embodiment, the hook retaining portions 414 fill in a majority of the aperture 455. As discussed above, respective protrusions 408 from the inner surfaces are received in respective recess 418 to align the mid channels 416, the first and second side curved channels 412A and 412B and the hook retaining portions 414 of the mated first and second hook protection portions 402A and 402B. The portion of the lanyard 440 and the end of the hook 454 are sandwiched between the first and second portions 402A and 402B, and the lanyard 440 extends through an opening to the channel proximate the second end 407 formed by the mid channels 416 of the respective first and second hook protection portions 402A and 402B. The fasteners 505 or 507 are respectfully inserted through the bore 404 in one of the hook protection portions 402A or 402B and threadably engaged with the thread bore 410 in the other of the hook protection portions 402A or 402B to secure the first and second portions 402A and 402B together. In some embodiments, the first and second portions 402A and 402B are releasably connectable and reusable.

Generally, the device 400 assists in preventing the lanyard 440 from moving on the hook's end 454, contacting the hook's actuator 453, and allowing the gate 452 to open inadvertently, which reduces the risk of roll-out. More specifically, in one embodiment the device 400 prevents the lanyard 440 from contacting the hook's actuator 453 by substantially filling in a remaining space in the hook's aperture 455 with the hook retaining portions 414 of the respective first and second hook protection portions 402A and 402B and by forming a tight fit against the lanyard 404 and the hook's end 454 to which the lanyard 404 is connected. The two portions 402A and 402B of the hook protection device 400 clamp down and place pressure on the lanyard 440 and the hook's end 454 to hold the lanyard 440 firmly against the hook's end 454 and so doing limits the movement of the lanyard 440 on the hook's end 454. This assists in preventing the lanyard 440 from contacting the hook's actuator 453. The fasteners 505 and 507 assists in securing the two portions 402A and 402B together to form the tight fit against the lanyard 440 and the hook's end 454. Without the device 400, should the lanyard 440 rotate on the hook's eye 455 and contact the actuator 453 of the hook 450, the gate 452 could then be opened and allow for roll-out, which is the unintentional disengagement of the hook 450 from a connecting point.

The device 400 in one embodiment is made of a clear, high impact plastic to enable inspection of the lanyard therein under without removing the device 400. In some embodiments, the device 400 includes a UV protective coating. In other embodiments the hook protection device is made of various colors to color-code hooks 450 connected to lanyards 440 similar to that described above.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A hook protection device comprising:
 a first member having a first inner surface;
 a second member having a second inner surface, the first inner surface of the first member and the second inner surface of the second member configured and arranged to be selectively coupled together; and
 wherein each of the first and second inner surfaces of the first and second members have a lanyard channel and at least one hook channel, the lanyard channel and the at least one hook channel forming a top extending portion in each first and second inner surface of the first and second members, the lanyard channels of the selectively coupled first and second members configured to encase a portion of a lanyard proximate an end portion of a hook, the at least one hook channels of the selectively coupled first and second members configured to encase the end portion of the hook proximate the portion of the lanyard, the top extending portions configured and arranged to extend in an aperture in the end portion of the hook with a portion of the lanyard.

2. The hook protection device of claim 1, wherein the lanyard channel of each first and second member includes a lanyard engaging protrusion configured to engage the lanyard.

3. The hook protection device of claim 1, wherein each of the first and second inner surfaces of the first and second members includes at least one of a mating protrusion and at least one of a mating recess, the at least one mating recess being complementary to the at least one mating protrusion, the at least one mating protrusion and the at least one mating recess configured to align the lanyard channel and the at least one hook channel of selectively coupled first and second inner surfaces of the first and second members.

4. The hook protection device of claim 1, wherein each first and second inner surface of the respective first and second members includes a hook retaining portion configured to fit into an aperture in the end portion of the hook, wherein abutted hook retaining portions of the selectively coupled first and second members retain the hook protection device on the hook.

5. The hook protection device of claim 4, wherein the top extending portions of the hook retaining portions of the selectively coupled first and second members are configured to substantially fill in the aperture in the end of the hook so as to limit movement of the lanyard in relation to the end of the hook.

6. The hook protection device of claim 1, wherein the first and second members have a select color used for color coordination with the hook to aid in differentiating hooks from each other.

* * * * *